(12) United States Patent
Dufour et al.

(10) Patent No.: US 10,079,118 B2
(45) Date of Patent: Sep. 18, 2018

(54) ELECTRODE FOR AN ELECTRIC-ENERGY STORAGE SYSTEM WITH COLLECTOR INCLUDING A PROTECTIVE CONDUCTIVE LAYER AND CORRESPONDING MANUFACTURING METHOD

(71) Applicant: HUTCHINSON, Paris (FR)

(72) Inventors: Bruno Dufour, Champagne sur Seine (FR); Carole Buffry, Pannes (FR); Marie Dieudonne, Laguiole (FR); Philippe Sonntag, Avon (FR)

(73) Assignee: HUTCHINSON, Paris (FR)

( * ) Notice: Subject to any disclaimer, the term of this patent is extended or adjusted under 35 U.S.C. 154(b) by 134 days.

(21) Appl. No.: 15/114,341

(22) PCT Filed: Jan. 27, 2014

(86) PCT No.: PCT/FR2014/050151
§ 371 (c)(1),
(2) Date: Jul. 26, 2016

(87) PCT Pub. No.: WO2015/110715
PCT Pub. Date: Jul. 30, 2015

(65) Prior Publication Data
US 2017/0011861 A1 Jan. 12, 2017

(51) Int. Cl.
*H01G 11/28* (2013.01)
*H01G 11/68* (2013.01)
(Continued)

(52) U.S. Cl.
CPC .......... *H01G 11/28* (2013.01); *C09D 109/02* (2013.01); *C09D 131/04* (2013.01); *H01G 11/68* (2013.01);
(Continued)

(58) Field of Classification Search
CPC ........ H01G 11/28; H01G 11/86; H01G 11/68; C09D 131/04; Y02E 60/13; Y02T 10/7022; H01M 4/667
See application file for complete search history.

(56) References Cited

U.S. PATENT DOCUMENTS 6,485,866 B1    11/2002  Gauthier et al.
6,631,074 B2 *  10/2003  Bendale .............. H01G 11/38
                                          361/502
(Continued)

FOREIGN PATENT DOCUMENTS

EP    1 043 790 A1   10/2000
FR    2 977 364 A1    1/2013
(Continued)

OTHER PUBLICATIONS

International Search Report dated Oct. 6, 2014, in PCT/FR2014/050151 Filed Jan. 27, 2014.

*Primary Examiner* — David M Sinclair
(74) *Attorney, Agent, or Firm* — Oblon, McClelland, Maier & Neustadt, L.L.P.

(57) ABSTRACT

The present invention relates to a conductive electrode for a system for the storage of electrical energy (1) having an aqueous electrolyte solution, said electrode comprising a metal current collector (3) and an active material (7), said current collector (3) comprising at least one conductive protective layer (5) which is leaktight to electrolytes and which is placed between said metal current collector (3) and said active material (7), said conductive protective layer (5) comprising:
  a polymer or copolymer binder comprising at least 50% of vinyl chloride unit,
  a crosslinked elastomer,
  at least one agent for crosslinking said crosslinked elastomer,
  conductive fillers.

25 Claims, 1 Drawing Sheet

(51) Int. Cl.
*H01G 11/86* (2013.01)
*C09D 109/02* (2006.01)
*C09D 131/04* (2006.01)
*H01M 4/66* (2006.01)

(52) U.S. Cl.
CPC ............ *H01G 11/86* (2013.01); *H01M 4/667* (2013.01); *Y02E 60/13* (2013.01); *Y02T 10/7022* (2013.01)

(56) References Cited

U.S. PATENT DOCUMENTS

| | | | |
|---|---|---|---|
| 2003/0022067 A1 | 1/2003 | Gauthier et al. | |
| 2006/0292384 A1 | 12/2006 | Kazaryan et al. | |
| 2009/0044389 A1 | 2/2009 | Kazaryan et al. | |
| 2010/0291442 A1* | 11/2010 | Wang | H01M 4/0404 429/231.95 |
| 2011/0267409 A1* | 11/2011 | Nawrocki | C09D 11/36 347/102 |
| 2012/0237824 A1 | 9/2012 | Koh et al. | |
| 2013/0071634 A1* | 3/2013 | Laprade | C09J 7/0203 428/200 |
| 2013/0143117 A1* | 6/2013 | Koh | H01G 11/30 429/211 |
| 2014/0153158 A1 | 6/2014 | Dufour et al. | |
| 2014/0154569 A1* | 6/2014 | Maeda | H01M 4/0404 429/211 |
| 2014/0255788 A1* | 9/2014 | Seki | C22F 1/04 429/245 |

FOREIGN PATENT DOCUMENTS

| | | | |
|---|---|---|---|
| JP | 02151645 A | * | 6/1990 |
| JP | 2000-100441 A | | 4/2000 |
| JP | 2001026655 A | * | 1/2001 |

* cited by examiner

ELECTRODE FOR AN ELECTRIC-ENERGY STORAGE SYSTEM WITH COLLECTOR INCLUDING A PROTECTIVE CONDUCTIVE LAYER AND CORRESPONDING MANUFACTURING METHOD

The present invention relates to conductive electrodes having current collectors used in particular in energy storage systems, such as supercapacitors. More specifically, the present invention relates to a conductive electrode comprising a current collector comprising at least one conductive protective layer and also to the process for the manufacture of said current collector.

Supercapacitors are electrical energy storage systems which are particularly advantageous for applications requiring the conveyance of high-power electrical energy. The possibilities of rapid charges and discharges and the increased lifetime with respect to a high-power battery make supercapacitors promising candidates for many applications.

Supercapacitors generally consist of the combination of two conductive electrodes having a high specific surface which are immersed in an ionic electrolyte and which are separated by an isolating membrane, known as "separator", which makes possible the ionic conductivity and prevents electrical contact between the electrodes. Each electrode is in contact with a metal current collector, making possible exchange of the electrical current with an external system. Under the influence of a potential difference applied between the two electrodes, the ions present within an electrolyte are attracted by the surface exhibiting an opposite charge, thus forming an electrochemical double layer at the interface of each electrode. The electrical energy is thus stored electrostatically by separation of the charges.

The expression of the capacitance of such supercapacitors is identical to that of conventional electrical capacitors, namely:

$$C = \varepsilon \cdot S/t$$

with: $\varepsilon$: the permittivity of the medium,
S: the surface area occupied by the double layer, and
t: the thickness of the double layer.

The capacitances achievable within supercapacitors are much greater than those commonly achieved by conventional capacitors, as a result of the use of porous electrodes having a high specific surface (maximization of the surface area) and of the extreme narrowness of the electrochemical double layer (a few nanometers).

The carbon-based electrodes used within supercapacitor systems necessarily have to be:
  conductive, in order to provide for the transportation of the electric charges,
  porous, in order to provide for the transportation of ionic charges and the formation of the electrical double layer over a large surface area, and
  chemically inert, in order to prevent any energy-consuming side reactions.

The energy stored within the supercapacitor is defined according to the conventional expression for capacitors, i.e.:

$$E = 1/2 \cdot C \cdot V^2,$$

in which V is the electrical potential of the supercapacitor.

From this expression, the capacitance and the potential are two essential parameters which it is necessary to optimize in order to favor the energy performance. For example, for applications in transportation and in particular for an electric vehicle, to have a high energy density is necessary in order to limit the on-board weight of supercapacitors.

The potential depends mainly on the nature of the electrolyte. There typically exist different types of electrolytes. One family is the family of organic electrolytes, that is to say comprising an organic salt dispersed in an organic solvent. Some of these electrolytes make it possible to achieve an operating potential of 2.7V. On the other hand, these electrolytes are expensive, flammable, toxic and potentially polluting. They thus present safety problems for use in a vehicle. Aqueous electrolytes are less expensive and non-flammable; they are thus more advantageous for this application. In an aqueous medium, the applicable potential is 1.2V. Different aqueous electrolytes can be used, for example an aqueous solution of sulfuric acid, or of potassium chloride, or of potassium sulfate, or of other salts, in an acidic, basic or neutral medium.

In order to store a high energy density, it is therefore necessary to have a high mass capacitance. The capacitance depends on the porous texture really accessible by the electrolyte; for its part, the potential depends directly on the stability of the electrolyte under the influence of the electrical field.

In order to obtain a high mass capacitance, a known solution is to add active material to the supercapacitors. There exist different possibilities for incorporating the active material in a supercapacitor. In order to achieve operation with high powers, the resistance to the passage of the current in the system (ESR) has to be very low. This is because this resistance brings about losses by the Joule effect, which reduce the output of the supercapacitor. This resistance is the sum of the resistances of the different components of the system and in particular the resistance of the electrolyte and the resistance of the current collectors. An essential contribution is the resistance of the interface between the current collector and the active material. This resistance is dependent on the quality and on the nature of the contact.

In order to limit the contribution of the resistances of the current collectors, it is necessary to use metals of high conductivities. Furthermore, for the sake of economy and of ease of use, the metals used have to be inexpensive and to be able to be easily shaped. Examples of metals which can be favorably used are thus typically copper and aluminum. However, the use of these materials in an aqueous medium presents problems of chemical and electrochemical stability. This is because, at a typical oxidation potential in an aqueous medium of 1.2V, the majority of metals corrode.

It is therefore necessary both to protect the metal collector from corrosion and to have a good electrical contact between the collector and the active material.

Different strategies have been used for this. The document EP 1 032 064 describes a current collector of a positive electrode composed of a paste of active material comprising a polymer layer comprising an oxalate and a compound based on silicon, on phosphate or on chromium. This solution makes it possible to protect the collector during the deposition of the paste of active material but has no effect on the characteristics of the electrode in use. It is thus necessary to use an interface between the metal current collector and the monolithic active material.

To use an interface having a lower conductivity than the metal of the collector between the latter and the active material presents a problem as it is highly likely to increase the resistance of the system and thus to disrupt operation with high electric powers. Different interfaces have been tested between the collector and the active material.

One solution consists in coating the collector with a protective layer. The document FR2824418 describes a current collector covered with a layer of paint comprising conductive particles, such as graphite or carbon black. The paint is applied between the collector and the active material and is then heated in order to remove the solvent. The paint is epoxy-based or polyurethane-based. This layer of paint makes it possible to protect the collector in an organic medium but no information is given with regard to its effectiveness in protecting the collector from an aqueous electrolyte.

The document WO2007/036641 describes a method for the deposition of a thin film of carbon by deposition of a dispersion of carbon-based particles in a polymeric sol-gel, followed by the removal of said polymeric sol-gel at high temperature. This additional layer makes it possible to improve the conductive properties at the level of the contact. Nevertheless, no information is given with regard to its leaktightness in an aqueous medium. Furthermore, the carbon-based films obtained by this method are delicate and subject to abrasion during the assembling of the electrodes.

One of the aims of the invention is thus to provide a current collector, and also its process of manufacture, having optimized longevity and conductivity properties.

The present invention thus relates to a conductive electrode for a system for the storage of electrical energy having an aqueous electrolyte solution, said electrode comprising a metal current collector and an active material, said current collector comprising at least one conductive protective layer which is leaktight to electrolytes and which is placed between said metal current collector and said active material, said conductive protective layer comprising:
  a polymer or copolymer binder comprising at least 50% of vinyl chloride unit,
  a crosslinked elastomer,
  at least one agent for crosslinking said crosslinked elastomer,
  conductive fillers.

According to one aspect of the invention, the proportions of the different components of the conductive protective layer are:
  from 10% to 50% of the polymer or copolymer binder comprising at least 50% of vinyl chloride unit,
  from 10% to 50% of the crosslinked elastomer,
  from 0.2% to 5% of the at least one agent for crosslinking said crosslinked elastomer, and
  from 25% to 50% of conductive fillers, as remainder in order to achieve a total of 100% by weight of dry matter.

According to another aspect of the invention, the polymer or copolymer binder comprising at least 50% of vinyl chloride unit is a copolymer comprising vinyl chloride and/or vinyl acetate units and/or carboxylic acid groups.

According to another aspect of the invention, the copolymer comprising vinyl chloride and/or vinyl acetate units and/or carboxylic acid groups is crosslinked and the conductive protective layer additionally comprises:
  an agent for crosslinking said copolymer comprising vinyl chloride and/or vinyl acetate units and/or carboxylic acid groups,
  a crosslinking catalyst.

According to another aspect of the invention, the proportion of the agent for crosslinking said copolymer comprising vinyl chloride and/or vinyl acetate units and/or carboxylic acid groups in the protective layer is from 2% to 8%, as remainder in order to achieve a total of 100% by weight of dry matter, and the proportion of the crosslinking catalyst is from 1% to 2%, as remainder in order to achieve a total of 100% by weight of dry matter.

According to another aspect of the invention, the agent for crosslinking said copolymer comprising vinyl chloride and/or vinyl acetate units and/or carboxylic acid groups is a mixture of methoxymethyl- and ethoxymethylbenzoguanamine.

According to another aspect of the invention, the crosslinking catalyst is an acid catalyst blocked by an amine.

According to another aspect of the invention, the binder comprising at least 50% of vinyl chloride unit is a polyvinyl chloride.

According to another aspect of the invention, the crosslinked elastomer is a hydrogenated butadiene/acrylonitrile copolymer.

According to another aspect of the invention, the conductive protective layer additionally comprises an additive for adhesion to the current collector in a proportion of 2% to 7%, as remainder in order to achieve a total of 100% by weight of dry matter.

According to another aspect of the invention, the conductive electrode comprises a primer layer placed between the metal current collector and the protective layer, said primer layer comprising a water-dispersible binder and conductive fillers.

According to another aspect of the invention, the water-dispersible binder is a polyurethane latex.

According to another aspect of the invention, the proportions of the different components of the primer layer are:
  from 60% to 70% of water-dispersible binder, and
  from 30% to 40% of conductive fillers, as remainder in order to achieve a total of 100% by weight of dry matter.

According to another aspect of the invention, the thickness of the primer layer is between 5 and 20 micrometers.

According to another aspect of the invention, the conductive fillers are chosen from carbon black and/or graphite and/or carbon nanotubes.

According to another aspect of the invention, the thickness of the conductive protective layer is between 5 and 30 micrometers.

The present invention also relates to a process for the manufacture of a conductive electrode having an aqueous electrolyte solution for a system for the storage of electrical energy, said electrode comprising a metal current collector, at least one conductive protective layer which is leaktight to electrolytes and a layer of active material, said process comprising the following stages:
  preparation of a protective composition comprising from 10% to 50% of a polymer or copolymer binder comprising at least 50% of vinyl chloride unit, from 10% to 50% of a crosslinked elastomer, from 0.2% to 5% of at least one agent for crosslinking said crosslinked elastomer and from 25% to 50% of conductive fillers, as remainder in order to achieve a total of 100% by weight of dry matter, which are diluted in a solvent in order to achieve a proportion of 20% to 25%,
  deposition of said protective composition on the metal current collector,
  first heat treatment of the covered metal current collector at a temperature lower than the boiling point of the solvent,
  second heat treatment of the covered metal current collector at a temperature greater than the glass transition temperature of the polymer or copolymer binder comprising at least 50% of vinyl chloride unit and than the boiling point of the solvent, said heat treatment temperature being, however, lower than the decomposition temperature of said binder, preparation and deposition of the layer of active material on the conductive protective layer.

According to one aspect of the process according to the invention, the polymer or copolymer binder comprising at least 50% of vinyl chloride unit is a copolymer comprising vinyl chloride and/or vinyl acetate units and/or carboxylic acid groups.

According to another aspect of the process according to the invention, the protective composition additionally comprises:
- from 2% to 8% of an agent for crosslinking the copolymer comprising vinyl chloride and/or vinyl acetate units and/or carboxylic acid groups,
- from 1% to 2% of a crosslinking catalyst, as remainder in order to achieve a total of 100% by weight of dry matter before dilution in the solvent.

According to another aspect of the process according to the invention, the agent for crosslinking said copolymer comprising vinyl chloride and/or vinyl acetate units and/or carboxylic acid groups is a mixture of methoxymethyl- and ethoxymethylbenzoguanamine.

According to another aspect of the process according to the invention, the crosslinking catalyst is an acid catalyst blocked by an amine.

According to another aspect of the process according to the invention, the polymer or copolymer binder comprising at least 50% of vinyl chloride unit is a polyvinyl chloride.

According to another aspect of the process according to the invention, the crosslinked elastomer is a hydrogenated butadiene/acrylonitrile copolymer.

According to another aspect of the process according to the invention, the protective composition additionally comprises an additive for adhesion to the current collector in a proportion of 2% to 7%, as remainder in order to achieve a total of 100% by weight of dry matter before dilution in the solvent.

According to another aspect of the process according to the invention, the process additionally comprises the following stages:
preparation of a primer composition comprising from 60% to 70% of water-dispersible binder and from 30% to 40% of conductive fillers, as remainder in order to achieve a total of 100% by weight of dry matter, diluted in an aqueous solvent,
deposition of said primer composition on the metal current collector,
drying of the metal current collector,
before the deposition of the protective composition on the metal current collector.

According to another aspect of the process according to the invention, the conductive fillers are choosing from carbon black and/or graphite and/or carbon nanotubes.

According to another aspect of the process according to the invention, the stage of deposition of the protective composition on the current collector is carried out using a film drawer.

According to another aspect of the process according to the invention, the first and second heat treatment stages each have a duration of 30 minutes.

Figure 1:
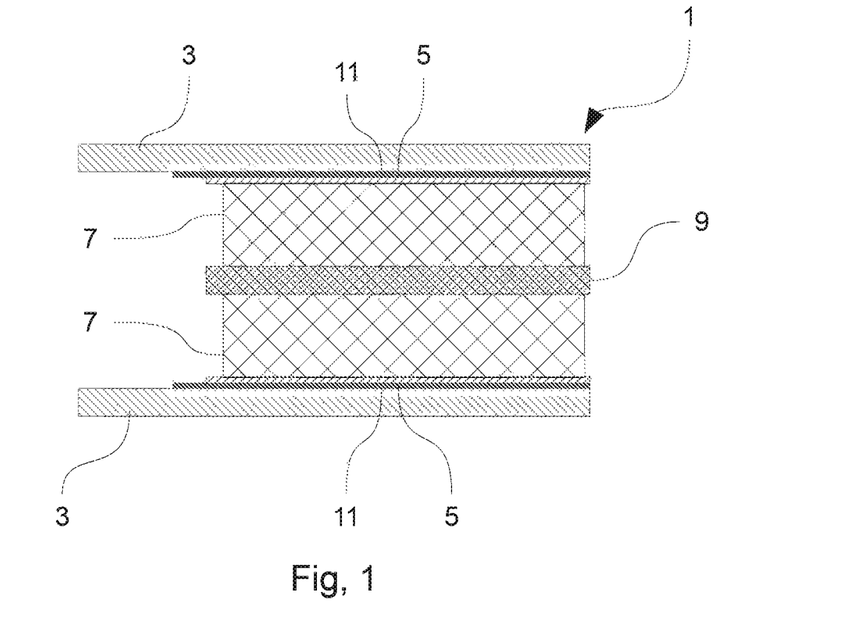
FIG. 1 shows a diagrammatic representation of the structure of a supercapacitor.

Other characteristics and advantages of the invention will become more clearly apparent on reading the following description, given as illustrative and nonlimiting example, and the appended figures, among which:

FIG. 1 shows a diagrammatic representation of the structure of a supercapacitor 1.

The supercapacitor 1 comprises two conductive electrodes which are immersed in an aqueous ionic electrolyte (not represented) and which are separated by an isolating membrane, known as separator 9, which makes possible the ionic conductivity and prevents electrical contact between the electrodes.

Each electrode comprises a metal current collector 3, for example made of copper or aluminum, covered with a conductive protective layer which is leaktight to electrolytes, for example with a thickness of between 5 and 30 micrometers, and also an active material 7 in contact with the separator 9. This conductive protective layer 5 makes possible in particular an improvement in the electrical contact between said metal current collector 3 and the active material 7.

The conductive protective layer 5 comprises:
a polymer or copolymer binder comprising at least 50% of vinyl chloride unit,
a crosslinked elastomer,
at least one agent for crosslinking said crosslinked elastomer,
conductive fillers.

Preferably, the proportions of these constituents of the conductive protective layer 5 are:
from 10% to 50% of the polymer or copolymer binder comprising at least 50% of vinyl chloride unit,
from 10% to 50% of the crosslinked elastomer,
from 0.2% to 5% of the agent for crosslinking said crosslinked elastomer, and
from 25% to 50% of conductive fillers,
as remainder in order to achieve a total of 100% by weight of dry matter.

According to a first embodiment, the polymer or copolymer binder comprising at least 50% of vinyl chloride unit can be a copolymer comprising vinyl chloride and/or vinyl acetate units and/or carboxylic acid groups, such as, for example, Vinriol® H15/45 M.

According to an alternative form, the copolymer comprising vinyl chloride and/or vinyl acetate units and/or carboxylic acid groups can be crosslinked within the conductive protective layer 5. In order to do this, the latter comprises an agent for crosslinking said copolymer comprising vinyl chloride and/or vinyl acetate units and/or carboxylic acid groups. This crosslinking agent can be a mixture of methoxymethyl- and ethoxymethylbenzoguanamine, for example Cymel® 1123.

The proportion of the agent for crosslinking said copolymer comprising vinyl chloride and/or vinyl acetate units and/or carboxylic acid groups in the protective layer 5 is preferably from 2% to 8%, as remainder in order to achieve a total of 100% by weight of dry matter.

In order for the crosslinking to take place, a catalyst for the crosslinking of the copolymer comprising vinyl chloride and/or vinyl acetate units and/or carboxylic acid groups is also added to the conductive protective layer 5. This catalyst can in particular be an acid catalyst blocked by an amine, such as Cycat 40-45. Its proportion within the conductive protective layer 5 is preferably from 1% to 2%, as remainder in order to achieve a total of 100% by weight of dry matter.

According to a second embodiment, the binder comprising at least 50% of vinyl chloride unit can be a polyvinyl chloride (PVC), in particular having a low molecular weight.

For its part, the crosslinked elastomer can be a hydrogenated butadiene/acrylonitrile copolymer (HNBr) crosslinked by peroxides, for example Luperox® 231XL, which are accompanied by a cocrosslinking agent, for example based on silica and on triallylcyanurate (TAC SIL).

The conductive fillers used are preferably carbon black, for example Ensaco® 260G, and/or graphite, for Timcal® or Timrex® or also carbon nanotubes.

The conductive protective layer 5 can additionally comprise an adhesion additive in a proportion of 2% to 7%, as remainder in order to achieve a total of 100% by weight of dry matter. This adhesion additive makes possible better adhesion of the protective layer 5 to the current collector 3. It can, for example, be a copolymer comprising acrylic functional groups and an olefinic base, such as, for example, Degalan® VP 4174E.

Each electrode can also comprise a primer layer 11, with a thickness which can be between 5 and 20 micrometers, placed between the metal current collector 3 and the protective layer 5. This primer layer 11 comprises in particular a water-dispersible binder and conductive fillers. This primer layer 11 provides the metal current collector 3 with additional protection against corrosion.

The term "water-dispersible" is understood to mean that the binder can form a dispersion in an aqueous-based solution.

The water-dispersible binder can be a polyurethane latex or a polyurethane/polycarbonate latex and the conductive fillers chosen from the same conductive fillers as those used in the conductive protective layer 5.

The proportions of the different components of the primer layer 11 are preferably as follows:
  from 60% to 70% of water-dispersible binder, and
  from 30% to 40% of conductive fillers,
  as remainder in order to achieve a total of 100% by weight of dry matter.

For its part, the active material 7 can be a carbon monolith or also result from an aqueous carbon-based composition, as, for example, described in the application FR2985598 filed on behalf of the applicant company.

The present invention also relates to a process for the manufacture of a conductive electrode having an aqueous electrolyte solution for a system for the storage of electrical energy, the conductive electrode comprising a metal current collector 3, at least one conductive protective layer 5 which is leaktight to electrolytes and a layer of active material 7.

Figure 2:
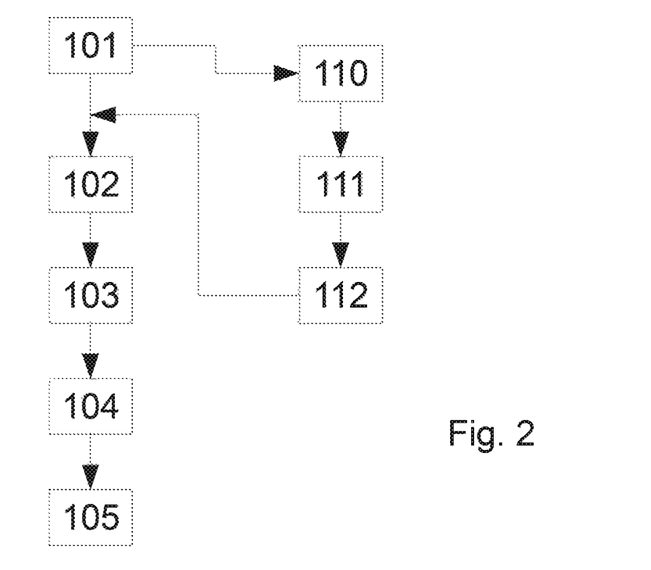
FIG. 2 shows a flow chart of the stages of the manufacturing process according to the invention.

The manufacturing process, illustrated in FIG. 2, comprises in particular the following stages:

a) Stage 101 of Preparation of a Protective Composition

This stage 101 is a stage of preparation of a protective composition comprising from 10% to 50% of a polymer or copolymer binder comprising at least 50% of vinyl chloride unit, from 10% to 50% of a crosslinked elastomer, from 0.2% to 5% of at least one agent for crosslinking said crosslinked elastomer and from 25% to 50% of conductive fillers, as remainder in order to achieve a total of 00% by weight of dry matter.

This protective composition is diluted in a solvent, for example methyl isobutyl ketone (MIBK), in order to achieve a proportion of 20% to 25%.

As described above, according to a first embodiment, the polymer or copolymer binder comprising at least 50% of vinyl chloride unit can be a copolymer comprising vinyl chloride and/or vinyl acetate units and/or carboxylic acid groups, such as, for example, Vinnol® H15/45 M.

According to an alternative form, the protective composition can also comprise an agent for crosslinking the copolymer comprising vinyl chloride and/or vinyl acetate units and/or carboxylic acid groups. This crosslinking agent can be a mixture of methoxymethyl- and ethoxymethylbenzoguanamine, for example Cymel® 1123.

The proportion of the agent for crosslinking said copolymer comprising vinyl chloride and/or vinyl acetate units and/or carboxylic acid groups is preferably from 2% to 8%, as remainder in order to achieve a total of 100% by weight of dry matter.

In order for the crosslinking to take place, a catalyst for the crosslinking of the copolymer comprising vinyl chloride and/or vinyl acetate units and/or carboxylic acid groups is also added to the protective composition. This catalyst can in particular be an acid catalyst blocked by an amine, such as Cycat 40-45. Its proportion within the protective composition is preferably from 1% to 2%, as remainder in order to achieve a total of 100% by weight of dry matter.

According to a second embodiment, the polymer or copolymer binder comprising at least 50% of vinyl chloride unit can be a polyvinyl chloride (PVC).

Still as described above, for its part, the crosslinked elastomer can be a hydrogenated butadiene/acrylonitrile copolymer (HNBr) crosslinked by peroxides, for example Luperox® 231XL, which are accompanied by a cocrosslinking agent, for example based on silica and on triallyl cyanurate (TAC SIL).

The conductive fillers used are preferably carbon black, for example Ensaco® 260G, and/or graphite, for Timcal® or Timrex® KS6L, or also carbon nanotubes.

The protective composition can additionally comprise an adhesion additive in a proportion of 2% to 7%, as remainder in order to achieve a total of 100% by weight of dry matter. This adhesion additive makes possible, in the end, better adhesion of the protective layer 5 to the current collector 3. It can, for example, be a copolymer comprising acrylic functional groups and an olefinic base, such as, for example, Degalan® VP 4174E.

b) Stage 102 of Deposition of the Protective Composition

This stage 102 is a stage of deposition of said protective composition on the metal current collector 3, for example using a film drawer.

c) Stage 103 of First Heat Treatment

During this stage 103, the covered metal current collector 3 is subjected to a first heat treatment at a temperature lower than the boiling point of the solvent, for example for a period of time of 30 minutes.

This heat treatment stage thus makes it possible to remove the solvent from the conductive protective layer 5 covering the metal current collector 3, while retaining the mechanical properties of this layer.

d) Stage 104 of Second Heat Treatment

During this stage 103, the covered metal current collector 3 is subjected to a second heat treatment at a temperature greater than the glass transition temperature of the binder comprising at least 50% of vinyl chloride unit and than the boiling point of the solvent, said heat treatment temperature being, however, lower than the decomposition temperature of said binder, for example for a period of time of 30 minutes.

The term "decomposition temperature" is understood to mean the temperature at which the copolymer is destroyed and disappears from the conductive protective layer 5.

This second heat treatment makes it possible to remove the surplus solvent and also to reinforce the leaktightness of the conductive protective layer 5. In addition, this stage makes possible the crosslinking of the different crosslinkable components of the conductive protective layer 5.

e) Stage 105 of Preparation and Deposition of the Layer of Active Material 7

During this stage 105, the active mate is prepared and deposited on the protective layer 5.

As described above, the active material 7 can be a carbon monolith or also result from an aqueous carbon-based composition, as, for example, described in the application FR2985598 filed on behalf of the applicant company.

In the case where the active material 7 results from an aqueous carbon-based composition, this stage 105 can in particular comprise the following substages:

- preparation of an aqueous composition of active material, for example starting from carbon black, from polyvinyl alcohol, from polyacrylic acid and from carboxymethylcellulose,
- deposition of the active material composition on the protective layer 5, for example using a film drawer,
- drying heat treatment, for example for 30 min at a temperature of 50° C.,
- crosslinking heat treatment, for example for 30 min at a temperature of 140° C. (this crosslinking can be carried out during stage 104 of second heat treatment of the conductive protective layer 5).

The manufacturing process can also comprise, before stage 102 of deposition of the protective composition on the metal current collector 3, the following stages:

- a stage 110 of preparation of a primer composition comprising from 60% to 70% of water-dispersible binder and from 30% to 40% of conductive fillers, as remainder in order to achieve a total of 100% by weight of dry matter, diluted in an aqueous solvent,
- a stage 111 of deposition of said primer composition on the metal current collector 3,
- a stage 112 of drying the metal current collector, for example for a period of time of 30 min at a temperature of 50° C., so as to obtain a primer layer 11 with a thickness of between 5 and 20 micrometers.

Three examples of formulations for the manufacture of a conductive protective layer 5 within a metal current collector 3 of a conductive electrode are illustrated below.

The desired parameters of these conductive protective layers 5 are as follows:

- surface conductivity>1 S/cm
- volume resistivity<80 mΩ
- dynamic corrosion time>7 h at 0.8V at 60° C.
- number of cycles of the closed cells at ambient temperature>300 000 cycles (it is the number of cycles for which the equivalent series resistance (ESR) of the system remains less than twice its initial value).
- number of cycles of the closed cells at 60° C.>10 000 cycles (it is the number of cycles for which the equivalent series resistance (ESR) of the system remains less than twice its initial value).

Formulation 1:

Different components described in table 1 below are mixed to give a paste of a protective composition.

TABLE 1

Compositions studied

| | Vinnol/HNBr ratio | | | | |
|---|---|---|---|---|---|
| | 50/50 | 60/40 | 70/30 | 40/60 | 30/70 |
| | Formulation | | | | |
| | Example 1 | Example 2 | Example 3 | Example 4 | Example 5 |
| Vinnol ® H15/45 M | 27.47 | 21.97 | 38.45 | 32.96 | 16.48 |
| HNBr | 27.47 | 32.96 | 16.48 | 21.97 | 38.45 |
| Timrex ® KS6L | 12.60 | 12.60 | 12.60 | 12.60 | 12.60 |
| Ensaco ® 260G | 24.92 | 24.92 | 24.92 | 24.92 | 24.92 |
| Luperox ® 231XL 40 | 2.08 | 2.08 | 2.08 | 2.08 | 2.08 |
| TAC SIL 70 | 0.69 | 0.71 | 0.71 | 0.71 | 0.71 |
| Degalan ® VP 4174E | 4.76 | 4.77 | 4.77 | 4.77 | 4.77 |

The binder used is Vinnol® H15/45 M. It is a copolymer comprising vinyl chloride and vinyl acetate units and carboxylic acid groups.

HNBr is an elastomer crosslinked by peroxides (Luperox® 231XL 40) and a cocrosslinking agent (TAC SIL 70).

The conductive fillers are carbon black (Ensaco® 260G) and graphite (Timcal®, Timrex® KS6L).

An additive, Degalan® VP 4174E, is used to improve the adhesion between the conductive protective layer 5 and the metal current collector 3. It is a dispersion of a copolymer comprising acrylic functional groups and an olefinic base.

The solvent is methyl isobutyl ketone (MIBK).

The solids content is subsequently adjusted to 21% by addition of methyl isobutyl ketone (MIBK).

Deposition of the Conductive Protective Layer 5:

140 microns of these compositions are subsequently deposited on the first face of a metal strip, acting as metal current collector 3, using a film drawer which makes possible homogenous and controlled deposition.

After drying at 50° C. for 30 minutes, the covered strips are subsequently crosslinked at 140° C. for 30 minutes.

The coating thickness is measured using a micrometer and is between and 20 microns.

The metal strips can be covered with a primer layer 11 produced in the following way:

Different components described in table 2 are mixed to give a paste of a primer composition.

TABLE 2 components of the primer composition:

| Formulation | |
|---|---|
| PU 6800 | 64.7 |
| Ensaco ® 260G | 11.76 |
| Timrex ® KS6L | 23.53 |

The polymer or copolymer binder used is PU 6800; it a latex of is polyurethane in the aqueous phase.

The conductive fillers are carbon black (Ensaco® 260G) and graphite (Timcal®, Timrex® KS6L).

Deposition of the Primer Layer 11:

55 microns of this primer composition is deposited on the first face of the metal strip using a film drawer which makes possible homogenous and controlled deposition.

After drying at 50° C. for 30 minutes, the coating thickness is measured using a micrometer and is between 15 and 20 microns.

Characterization:

The covered metal strips are subsequently characterized in three different ways.

1) A deposition of the coating is carried out on glass according to the same method used on the metal current collector 3. A four-point conductivity measurement makes it possible to determine the intrinsic electrical conductivity of the protective coating composed of the conductive protective layer 5 and with, if appropriate, the primer layer 11.

2) A volume resistivity test is carried out by placing under pressure a 3 cm$^2$ square of two bands of covered strips. Pressure sweeping from 100N, 125N, 150N to 200N is carried out. This measurement makes it possible to perceive the compatibility at the interface of the different layers. The resistivity measured must be as low as possible in order to allow the supercapacitor to operate at high power.

3) A dynamic corrosion measurement via a three-electrode arrangement at 60° C. under 0.8V. If the conductive protective coating holds for 7 h, that is to say if no corrosion of the metal current collector 3 is observed, then the test is validated. The objective of this measurement is to force the oxidation and thus the corrosion in order to evaluate the performance of the system under conditions as close as possible to real cases.

Preparation of Closed Cells 1:

The evaluation of the overall performance of the system is carried out within closed cells 1 as illustrated in FIG. 1.

The covered metal strips intended for the first electrode subsequently coated with 305 μm of aqueous solution of active material 7, as described in example 1 of the application FR2985598, with the aim of having 150 μm after drying at 50° C. for 30 min. The layers are crosslinked at 140° C. for 30 min.

The same process is carried out for the second electrode, with a dry weight of active material of 90 μm, i.e. 155 μm wet.

The closed cells 1 are obtained by assembling the two electrodes, between which is placed a cellulose separator 9. The closed cells 1 are subsequently partially immersed in a 5M aqueous solution of lithium nitrate electrolyte and are protected between two heat-sealable plastic films with a thickness of 90 μm.

As is shown in table 3 of experimental results, the conductive protective layer 5 described in examples 1 to 5 makes it possible not only to improve the contact with the metal collector but also, via the combination with the primer layer 11, to protect the metal current collector from degradation related to oxygenation in the presence of electrolyte.

Example 1 of formulation 1 was subsequently coated and characterized (table 4) on an aluminum metal strip with a thickness of 50 μm.

TABLE 4

Properties of an aluminum metal strip with a thickness of 50 μm coated with formulation 1:

| | Formulation | |
|---|---|---|
| | Ex. 1 with primer layer | Ex. 8 No coating |
| Electrical conductivity of the protective coating (S/cm) | 1.6 | 37.10$^4$ |
| Resistance at 200N (mΩ) | 43 | 4 |
| Dynamic corrosion at 60° C., 0.8 V | + | − |
| ESR cell (mΩ) | 17 | |
| Number of cycles at ambient temperature | 100 000 | 0 |

Just as for copper, the conductive protective layer described in example 1 makes it possible to protect the metal collector.

Likewise, "example 1 without primer layer" confirms that it is important to have a primer layer 11 between the metal current collector 3 and the conductive protective layer 5 in order to reduce the risks of corrosion.

Formulation 2:

Different components described in table 5 below are mixed to give a paste of a protective composition.

TABLE 5

Compositions studied

| Formulation | Ex. 9 |
|---|---|
| Vinnol ® H15/45 M | 29.00 |
| HNBr | 29.00 |
| Ensaco ® 260G | 23.00 |
| Luperox ® 231XL 40 | 0.88 |
| Timrex ® KS6L | 13.12 |
| TAC SIL 70 | 0.74 |
| Cymel ® 1123 | 4.26 |
| Cycat 4045 | 1.5 |

TABLE 3

Properties of copper metal strips with a thickness of 12.5 μm coated with formulation 1:

| Formulation | Ex. 1 With primer layer | Ex. 2 With primer layer | Ex. 3 With primer layer | Ex. 4 With primer layer | Ex. 5 With primer layer | Ex. 1 Without primer layer | Ex. 7 No coating |
|---|---|---|---|---|---|---|---|
| Electrical conductivity of the protective coating (S/cm) | 1.60 | 1.24 | 1.76 | 2.62 | 1.57 | ////// | 59.10$^4$ |
| Resistance at 200N (mΩ) | 20 | 24 | 28 | 20 | 20 | 17 | 8 |
| Dynamic corrosion at 60° C., 0.8 V +: test successful −: failure, corrosion observed | + | + | + | + | + | − | − |
| ESR cell (mΩ) | 15 | | | | | 11 | |
| Number of cycles at ambient temperature | 300 000 | | | | | 0 | 0 |
| Number of cycles at 60° C. | 10 000 | | | | | 0 | 0 |

The polymer or copolymer binder used is Vinnol® H15/45 M. It is a copolymer comprising vinyl chloride and vinyl acetate units and carboxylic acid groups. This copolymer is crosslinked by a mixture of methoxymethyl- and ethoxymethylbenzoguanamine. The crosslinking agent used is Cymel® 1123. The catalyst for the crosslinking of the polymer or copolymer binder used is an acid catalyst blocked by an amine (Cycat 40-45).

HNBr is an elastomer crosslinked by peroxides (Luperox® 231XL 40) and a cocrosslinking agent (TAC SIL 70).

The conductive fillers are carbon black (Ensaco® 260G) and graphite (Timcal, Timrex KS6L).

The solvent is methyl isobutyl ketone (MIBK).

The solids content is subsequently adjusted to 21% by addition of methyl isobutyl ketone (MIBK).

The deposition of the conductive protective layer and the characterizations are carried out as for formulation 1.

TABLE 6

Properties of copper metal strips with a thickness of 12.5 μm coated with formulation 2:

|  | Formulation | |
| --- | --- | --- |
|  | Ex. 9 With primer layer | Ex. 7 No coating |
| Electrical conductivity of the protective coating (S/cm) | 2.2 | 59.10⁴ |
| Resistance at 200N (mΩ) | 20 | 8 |
| Dynamic corrosion 60° C., 0.8 V | + | − |
| ESR cell (mΩ) | 15 |  |
| Number of cycles at 60° C. | 60 000 | 0 |

TABLE 7

Properties of an aluminum metal strip with a thickness of 50 μm coated with formulation 1:

|  | Formulation | |
| --- | --- | --- |
|  | Ex. 9 With primer layer | Ex. 8 No coating |
| Electrical conductivity of the protective coating (S/cm) | 2.2 | 37.10⁴ |
| Resistance at 200N (mΩ) | 77 | 4 |
| Dynamic corrosion at 60° C., 0.8 V | + | − |
| ESR cell (mΩ) | 22 |  |
| Number of cycles at 60° C. | 70 000 | 0 |

As shown in tables 6 and 7 of experimental results, the conductive protective layer 5 described in example 9 makes it possible not only to improve the contact with the metal current collector 3 but also, via the combination with the primer layer 11, to protect the metal current collector 3 from degradation related to oxygenation in the presence of electrolyte.

Formulation 3:

Different components described in table 8 below are mixed to give a paste of a protective composition.

TABLE 8

Compositions studied

|  | PVC/HNBr ratio | | |
| --- | --- | --- | --- |
|  | 50/50 | 55/45 | 40/60 |
|  | Formulation | | |
|  | Example 10 | Example 11 | Example 12 |
| PVC | 28.84 | 24.49 | 16.85 |
| HNBR 2010 L | 28.84 | 30.61 | 33.70 |
| Graphite KS6L | 13.24 | 14.05 | 15.47 |
| Ensaco 260G | 26.16 | 27.76 | 30.57 |
| Luperox 231XL 40 | 2.19 | 2.33 | 2.56 |
| TAC SIL 70 | 0.72 | 0.77 | 0.84 |

The binder used is a hydrophobic PVC polymer without a hydrolyzable functional group.

HNBr is an elastomer crosslinked by peroxides (Luperox® 231XL) and a cocrosslinking agent (TAC SIL).

The conductive fillers are carbon black (Ensaco® 260G) and graphite (Timcal®, Timrex® KS6L).

The solvent is methyl isobutyl ketone (MIBK).

The solids content is subsequently adjusted to 21% by addition of methyl isobutyl ketone (MIBK).

The deposition of the conductive protective layer 5 and the characterizations are carried out as for formulations 1 and 2.

TABLE 9

Properties of copper metal strips with a thickness of 12.5 μm coated with formulation 3:

|  | Formulation | | | |
| --- | --- | --- | --- | --- |
|  | Ex. 10 with primer layer | Ex. 11 with primer layer | Ex. 12 with primer layer | Ex. 7 No coating |
| Electrical conductivity of the protective coating (S/cm) | 2.9 | 5.3 | 1.76 | 59.10⁴ |
| Resistance at 200N (mΩ) | 15 | 14 | 28 | 8 |
| Dynamic corrosion at 60° C., 0.8 V | + | + | + | − |

As shown in table 9 of experimental results, the conductive protective layer 5 described in examples 10 to 12 makes it possible not only to improve the contact with the metal current collector 3 but also, via the combination with the primer layer 11, to protect the metal current collector 3 from degradation related to oxygenation in the presence of electrolyte.

The invention claimed is:

1. A conductive electrode, comprising:
   a metal current collector;
   an active material,
   said metal current collector comprising at least one conductive protective layer, which is leaktight to electrolytes and which is placed between said metal current collector and said active material,
   said conductive protective layer comprising:
   a polymer or copolymer binder comprising at least 50% of vinyl chloride unit,
   a crosslinked elastomer,
   at least one agent for crosslinking said crosslinked elastomer, and
   conductive fillers; and a primer layer placed between the metal current collector and the conductive protective layer, said primer layer comprising a water-dispersible binder and conductive fillers;
wherein proportions of different components of the primer layer are:
from 60% to 70% of the water-dispersible binder, and
from 30% to 40% of the conductive fillers, as remainder in order to achieve a total of 100% by weight of dry matter.

2. The conductive electrode of claim 1, wherein the proportions of the different components of the conductive protective layer are:
from 10% to 50% of the polymer or copolymer binder comprising at least 50% of vinyl chloride unit,
from 10% to 50% of the crosslinked elastomer,
from 0.2% to 5% of the at least one agent for crosslinking said crosslinked elastomer, and
from 25% to 50% of conductive fillers,
as remainder in order to achieve a total of 100% by weight of dry matter.

3. The conductive electrode of claim 1, wherein the polymer or copolymer binder comprising at least 50% of vinyl chloride unit is a copolymer comprising vinyl chloride and/or vinyl acetate units and/or carboxylic acid groups.

4. The conductive electrode of claim 3, wherein the copolymer comprising vinyl chloride and/or vinyl acetate units and/or carboxylic acid groups is crosslinked, and
wherein the conductive protective layer additionally comprises:
an agent for crosslinking said copolymer comprising vinyl chloride and/or vinyl acetate units and/or carboxylic acid groups, and
a crosslinking catalyst.

5. The conductive electrode of claim 4, wherein
the proportion of the agent for crosslinking said copolymer comprising vinyl chloride and/or vinyl acetate units and/or carboxylic acid groups in the protective layer is from 2% to 8%, as remainder in order to achieve a total of 100% by weight of dry matter, and
the proportion of the crosslinking catalyst is from 1% to 2%, as remainder in order to achieve a total of 100% by weight of dry matter.

6. The conductive electrode of claim 4, wherein the agent for crosslinking said copolymer comprising vinyl chloride and/or vinyl acetate units and/or carboxylic acid groups is a mixture of methoxymethyl- and ethoxymethylbenzoguanamine.

7. The conductive electrode of claim 4, wherein the crosslinking catalyst is an acid catalyst blocked by an amine.

8. The conductive electrode of claim 1, wherein the polymer or copolymer binder comprising at least 50% of vinyl chloride unit is a polyvinyl chloride.

9. The conductive electrode claim 1, wherein the crosslinked elastomer is a hydrogenated butadiene/acrylonitrile copolymer.

10. The conductive electrode claim 1, wherein the conductive protective layer additionally comprises an additive for adhesion to the current collector in a proportion of 2% to 7%, as remainder in order to achieve a total of 100% by weight of dry matter.

11. The conductive electrode of claim 1, wherein the water-dispersible binder is a polyurethane latex or a polyurethane/polycarbonate latex.

12. The conductive electrode claim 1, wherein a thickness of the primer layer is between 5 and 20 micrometers.

13. The conductive electrode of claim 1, wherein the conductive fillers are chosen from carbon black and/or graphite and/or carbon nanotubes.

14. The conductive electrode of claim 1, wherein a thickness of the conductive protective layer is between 5 and 30 micrometers.

15. A process for the manufacture of a conductive electrode having an aqueous electrolyte solution, said electrode comprising a metal current collector, at least one conductive protective layer, which is leaktight to electrolytes, and a layer of active material, said process comprising:
preparing a protective composition comprising from 10% to 50% of a polymer or copolymer binder comprising at least 50% of vinyl chloride unit, from 10% to 50% of a crosslinked elastomer, from 0.2% to 5% of at least one agent for crosslinking said crosslinked elastomer and from 25% to 50% of conductive fillers, as remainder in order to achieve a total of 100% by weight of dry matter, which are diluted in a solvent in order to achieve a proportion of 20% to 25%;
preparing a primer composition comprising from 60% to 70% of water-dispersible binder and from 30% to 40% of conductive fillers, as remainder in order to achieve a total of 100% by weight of dry matter, diluted in an aqueous solvent;
depositing said primer composition on the metal current collector;
drying of the metal current collector;
depositing said protective composition on the metal current collector;
performing a first heat treatment of the covered metal current collector at a temperature lower than a boiling point of the solvent;
performing a second heat treatment of the covered metal current collector at a temperature greater than a glass transition temperature of the binder comprising at least 50% of vinyl chloride unit and greater than the boiling point of the solvent, said second heat treatment temperature being lower than a decomposition temperature of said binder; and
preparing and depositing the layer of active material on the conductive protective layer.

16. The manufacturing process of claim 15, wherein the polymer or copolymer binder comprising at least 50% of vinyl chloride unit is a copolymer comprising vinyl chloride and/or vinyl acetate units and/or carboxylic acid groups.

17. The manufacturing process of claim 16, wherein the protective composition additionally comprises:
from 2% to 8% of an agent for crosslinking the copolymer comprising vinyl chloride and/or vinyl acetate units and/or carboxylic acid groups; and
from 1% to 2% of a crosslinking catalyst,
as remainder in order to achieve a total of 100% by weight of dry matter before dilution in the solvent.

18. The manufacturing process of claim 17, wherein the agent for crosslinking said copolymer comprising vinyl chloride and/or vinyl acetate units and/or carboxylic acid groups is a mixture of methoxymethyl- and ethoxymethylbenzoguanamine.

19. The manufacturing process of claim 17, wherein the crosslinking catalyst is an acid catalyst blocked by an amine.

20. The manufacturing process of claim 15, wherein the polymer or copolymer binder comprising at least 50% of vinyl chloride unit is a polyvinyl chloride.

21. The manufacturing process of claim 15, wherein the crosslinked elastomer is a hydrogenated butadiene/acrylonitrile copolymer.

22. The manufacturing process of claim 21, wherein the protective composition additionally comprises an additive for adhesion to the current collector in a proportion of 2% to 7%, as remainder in order to achieve a total of 100% by weight of dry matter before dilution in the solvent.

23. The manufacturing process claim 15, wherein the conductive fillers are chosen from carbon black and/or graphite and/or carbon nanotubes.

24. The manufacturing process of claim 15, wherein the deposition of the protective composition on the current collector is carried out with a film drawer.

25. The manufacturing process of claim 15, wherein the first heat treatment and the second heat treatment each have a duration of 30 minutes.

\* \* \* \* \*